Sept. 5, 1961 C. L. VICE ET AL 2,998,906

CAPSTAN IDLER ASSEMBLY

Filed Nov. 24, 1958

INVENTORS:
Charles L. Vice
William E. Dunn
Thomas A. Fowler

By Smyth & Roston
Attorneys

United States Patent Office 2,998,906

Patented Sept. 5, 1961

2,998,906
CAPSTAN IDLER ASSEMBLY

Charles L. Vice, Pasadena, William E. Dunn, Los Angeles, and Thomas A. Fowler, Torrance, Calif., assignors to Minnesota Mining and Manufacturing Company, St. Paul, Minn., a corporation of Delaware Filed Nov. 24, 1958, Ser. No. 776,110
12 Claims. (Cl. 226—187)

This invention relates to means for driving a strip, such as a magnetic tape, along a predetermined path past transducer means for recording or reproducing signals, and is particularly directed to the problem of actuating and accurately guiding such a tape by means of a drive capstan and cooperating idler means.

In any tape driving mechanism in which an idler roller is biased to press the tape against the periphery of a drive capstan, the tape responds to the slightest misalignment of the idler roller relative to the capstan, and also responds to slight unevenness of the pressure applied by the idler roller. It is common practice to place the traveling tape in tension at the transducer. This may be done by tension either from the reels or locally from the capstan, the latter arrangement requiring means to provide accuracy of azimuth and skew for satisfactory recording and reproducing of signals. In the arrangement where tension is applied locally from the capstan, the tape is even more sensitive to adjustment of the idler roller relative to the capstan since the change in tension in the traveling tape occurs where it is seized between the idler roller and the capstan.

While the invention is broadly applicable for its purpose, it has special utility in a drive mechanism wherein two idler rollers cooperate with opposite sides of a drive capstan for the dual purpose of driving a loop of tape past transducer means and of placing the loop under tension. This particular application of the invention is selected for the present disclosure and will provide adequate guidance for those skilled in the art who may have occasion to apply the same principles to other particular purposes.

In the arrangement under consideration wherein two idler rollers cooperate with opposite sides of a capstan to place a loop of the traveling tape under tension, the two idler rollers act differentially on the tape by cooperating respectively with two different diameters of the capstan. This differential action makes the relationship between each idler roller and the capstan highly critical. Only a minute misalignment of either one of the idler rollers introduces a skewing force to shift the path of the tape. If multiple tracks of signals are being recorded, the deviation of the traveling tape from its normal path results in corresponding deviation of the tracks on the tape. If multiple track signals are being reproduced from an accurately recorded tape, the deviation in tape travel affects the reproduced signals. For example, if the recorded multiple track signals are amplitude modulated, deviation of the path of travel of the tape introduces amplitude fluctuations that may seriously modify the recorded modulation.

Theoretically, it is possible to fabricate an assembly of a capstan and two associated idler rollers with such care and precision that the assembly will drive and guide a tape accurately from the start. Such precision fabrication is expensive and actually cannot be relied upon to produce the intended result.

The present invention meets this problem by mounting each idler roller in a manner that permits precise adjustment of the idler roller relative to the capstan by exceedingly small increments after the assembly is completed and placed in operation. The alignment of the axis of rotation of an idler roller relative to the axis of rotation of the capstan may be adjusted in a plane radially of the capstan axis and may also be adjusted independently in a plane perpendicular to the radial plane. In addition, the preferred practice of the invention permits axial shift of the idler roller relative to the capstan. The invention further solves the problem of fabricating an adjustable assembly of this character that may be depended upon to maintain any given adjustment indefinitely.

In the preferred practice of the invention, the idler roller is mounted on an axle member and the axle member in turn is mounted on arm means that is actuated by a solenoid to press the idler roller against the tape on the periphery of the capstan. A first end of the axle member is pivotally mounted on the arm means and the second end of the axle member is confined by the arm means in a manner that permits adjustment of the second end relative to the arm means. A first adjustment means is provided to shift the second end of the axle member in a first direction radially of the capstan and a second independent adjustment means is provided to shift the second end of the axle member in a second direction substantially perpendicular to the radial direction.

The invention teaches that the means for pivotally mounting the first end of the axle member may comprise, for example, a resilient sheet member that is marginally secured to the arm means and flexes to permit the desired pivotal universal movement of the axle member. In the preferred practice of the invention, the first end of the axle member is threaded and screws into a captive nut that is mounted in the resiliently flexible member. The axle member may be rotated in this captive nut for axial shift of the idler roller, the captive nut being of the self-locking type to maintain any axial position to which the axle member is adjusted.

The various features and advantages of the invention may be understood from the following description considered with the accompanying drawing.

In the drawing, which is to be regarded as merely illustrative:

Figure 1:
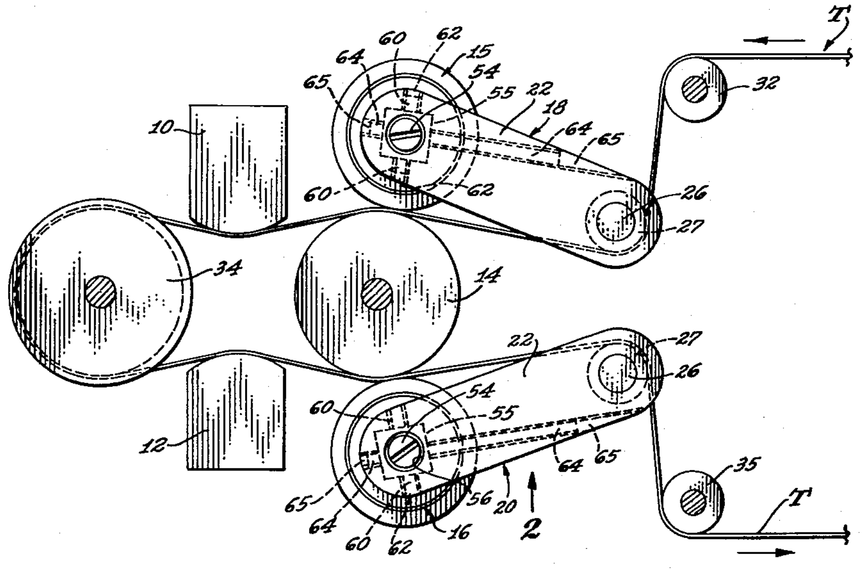
FIG. 1 is a simplified plan view of a tape actuating arrangement incorporating the presently preferred embodiment of the invention.
Figure 2:
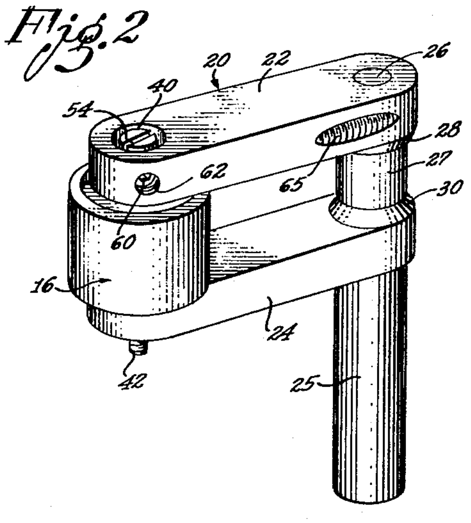
FIG. 2 is a perspective view of one of the two idler rollers that cooperates with the capstan in FIG. 1.

FIG. 1 shows how a magnetic tape, designated T, may be driven and guided past a pair of transducers 10 and 12 by means including a capstan assembly constructed as taught by the invention. The capstan assembly comprises a drive capstan 14 and two cooperating idler rollers 15 and 16 mounted respectively on two arm means, generally designated 18 and 20. As best shown in FIG. 2, each of the two arm means 18 and 20 may comprise an upper arm 22 and a lower arm 24, rigidly mounted in spaced parallel relation on an upright spindle 25, this assembly being unified by brazing. The guide roller is mounted between the outer ends of the two arms 22 and 24 and the portion 27 of the spindle 25 that lies between the two arms serves as a guide means for change in direction of the traveling tape. For this purpose, opposed bevels 28 and 30 are provided to center the traveling tape on the guide portion 27.

As shown in FIG. 1, the traveling tape passes around the guide means 32 and then passes around the guide portion 27 of the first arm means 18 to reach the periphery of the capstan 14 where the idler roller 15 presses the tape against the capstan. The tape then traverses the transducer 10 and returns around a reversing idler or post 34 to traverse the second transducing means 12, The returning tape is again engaged between the capstan 14 and the second capstan idler 16 and continues around the guide portion 27 of the second arm means 20 and a guide means 35 corresponding to guide means 32.

The loop of the traveling tape T that passes around the reversing idler 34 is placed under suitable tension by the previously mentioned differential action of the two capstan idlers 15 and 16 in cooperation with the capstan 14. This differential action need not be discussed in detail for the purpose of the present invention. It is sufficient to state that the differential action makes the adjustment of the capstan idlers 15 and 16 highly critical.

Figure 3:
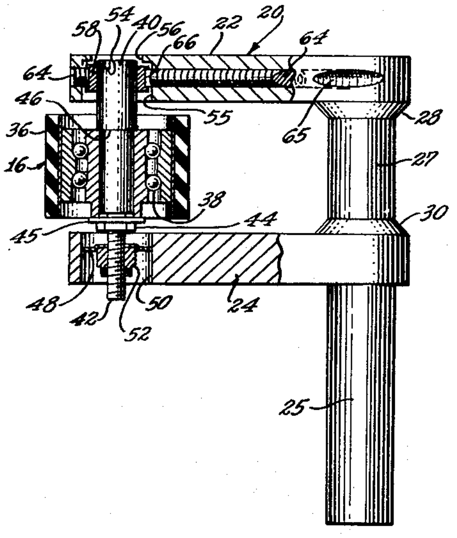
FIG. 3 is a view of the same idler roller and the arm on which it is mounted, the view being partly in side elevation and partly in section.

As best shown in FIG. 3, each of the two capstan idlers 15 and 16 has a rubber-like peripheral wall 36 for contact with the traveling tape and may be mounted by a suitable ball bearing 38 on an axle member 40. In the construction shown, the lower end portion 42 of the axle member 40 is reduced in diameter and threaded. A lock nut 44 on the lower threaded portion 42 cooperates with a washer 45 to tighten the inner race of the ball bearing 38 against a circumferential shoulder 46 of the axle member.

While various means may be employed in various practices of the invention for mounting one end of the axle member 40 on the arm means, the use of a flexible metal disk for this purpose has been found to be highly advantageous. With the axle member connected to such a disk centrally thereof and with marginal portions of the disk securely anchored to the arm means, the disk flexes readily for the desired range of pivotal adjustment, but nevertheless supports the end of the axle member in a stable manner.

FIG. 3 shows how a flexible metal disk 48 may be mounted in a circular opening 50 in the lower arm 24 of the arm means 20. The peripheral edge of the metal disk 48 is suitably bonded in place, for example, by furnace brazing. The flexible metal disk 48 is centrally apertured to receive the threaded lower end portion 42 of the axle member 40 and a suitable nut 52 is bonded to the metal disk around the central aperture for engagement by the screw thread of the axle member. The captive nut 52 is preferably of a "self-locking" type which grips the screw thread of the axle member in a manner to resist loosening of the axle member. It is apparent that the axle member 40 may be shifted axially simply by screwing or unscrewing the axle member relative to the captive nut 52. To facilitate this adjustment, the upper end of the axle member 40 is formed with a screw driver slot 54.

The upper end of the axle member 40 may be engaged by the upper arm 22 in any suitable manner that provides freedom for axial adjustment of the axle member as well as freedom for universal rocking of the axle member about the pivot point provided by the flexible disk 48. In the construction shown, the upper arm 22 is formed with a rectangular recess 55 that is open on the underside of the arm, and the upper end of the axle member 40 extends into this rectangular recess. The upper arm has a circular opening 56 on its upper side to make the screw driver slot 54 of the axle member accessible, the circular opening 56 being over-sized relative to the axle member 40 to make the screw driver slot accessible throughout a liberal range of lateral adjustment of the axle member end.

The upper end of the axle member 40 is snugly but rotatably embraced by a collar 58 of rectangular configuration that is positioned in the rectangular recess 55 with liberal clearance for the collar to shift in the recess in directions parallel to its sides. As may be seen in FIG. 1, the rectangular recess 55 in the upper arm 22 of each of the arm means 18 and 20 is oriented radially of the axis of the capstan 14 so that the rectangular collar 58 in the recess may be readily adjusted in a plane radially of the capstan 14 and may also be adjusted independently in a plane perpendicular to the radial plane.

In the construction shown, the rectangular collar 58 is confined in the radial plane by a pair of opposed set screws 60 which are threaded into a pair of correspondingly diametrically aligned bores 62 in the arm 22. In like manner, the rectangular collar 58 is confined in the perpendicular plane between a pair of opposed set screws 64 in a corresponding pair of diametrically aligned bores 65. Preferably the rectangular collar 58 has a peripheral groove 66 extending around its four sides for engagement by the set screws 60 and 64. The upper arms 22 in which these two pairs of threaded bores are provided for the two pairs of set screws are not perpendicular to the radial planes and, therefore, the diametrical set of bores 65 are inclined relative to the longitudinal axis of the arms. By virtue of this arrangement in which the bores 65 are perpendicular to radial planes from the capstan through the axle members 40 but the arms 22 are not perpendicular to these planes, the bores 65 avoid the axis of the spindle 25. Consequently, the longer bores 65 are readily accessible by a screw driver without interference by the spindle 25.

The manner in which the invention serves its purpose may be readily understood from the foregoing description. It is a simple matter to fabricate the described assembly with assurance that the ultimate adjustment of each of the two axle members 40 will be within the range of longitudinal adjustability of the axle member 40 in the captive nut 52 and within the range of the two degrees of adjustability of the rectangular collar 58 in the rectangular recess 55. When the assembly is completed, a spool of tape is threaded through the assembly and then the assembly is operated to ascertain what adjustments are required to cause the tape to run accurately along the desired path.

It is a simple matter to observe the behavior of the running tape and to make whatever corrective adjustments are required to cause the tape to run true. To adjust the angle of the axle member 40 in the radial plane of the capstan 14, it is a simple matter to loosen one of the two screws 60 and to tighten the other screw for the required change. In like manner, a change may be made independently in the perpendicular plane by loosening one of the two screws 64 and tightening the other screw. With all four of the screws 60 and 64 tight to immobilize the rectangular collar 68, it is a simple matter to turn the axle member 40 by means of a screw driver for shifting the axle member along its axis.

Our description in specific detail of the selected embodiment of the invention will suggest various changes, substitutions and other departures from our disclosure within the spirit and scope of the appended claims.

We claim:

1. In apparatus for directing a travelling tape accurately along a particular path past a capstan, an idler provided with an annular configuration and constructed to press the tape against the capstan and rotatable to obtain a movement of the tape, an axle member extending through the idler in coaxial relationship with the idler, means disposed relative to the idler and the axle member for providing a support of the idler by the axle member and for providing for a rotation of the idler relative to the axle member, flexible means disposed at one end of the axle member for providing a support for the axle member and for providing for pivotal movements of the axle member in accordance with the forces applied by the capstan against the idler to maintain a uniform force between the idler and the capstan at different positions along the idler, and means disposed at the opposite end of the axle member from the flexible means for adjusting the axle member and the idler radially and tangentially relative to the capstan.

2. The combination set forth in claim 1, in which means are included to obtain an axial adjustment of the axle member and the idler relative to the capstan.

3. In apparatus for directing a travelling tape accurately along a particular path past an annular capstan, a spindle disposed in spaced relationship to the capstan, a pair of arms disposed in spaced relationship to each other in the axial direction of the capstan and supported at a first end by the spindle and extending from the spindle in a direction toward the capstan, an axle member supported by the pair of arms at second ends of the arms opposite to the first ends, and disposed in the axial direction of the capstan, an idler supported by the axle member in axial relationship to the axle member and at a position between the pair of arms and in rotatable relationship to the axle member and at a position relative to the capstan to provide for a disposition of the idler and the capstan against opposite surfaces of the tape, means supported by a first one of the arms in the pair for obtaining an adjustment of the axle member and the idler in radial and tangential directions relative to the idler and the capstan to adjust the forces exerted by the idler and the capstan against the tape, and means supported by the second one of the arms in the pair and providing a flexible support for the axle member to produce a pivotal movement of the axle member about the first arm as a fulcrum to stabilize the forces exerted by the idler and the capstan against the tape at different positions along the idler and the capstan.

4. The combination set forth in claim 3 in which the flexible means in the second arm is constructed to provide for an axial adjustment of the axle member and the idler relative to the capstan and in which a particular one of the arms in the pair is provided with an opening to obtain such an axial adjustment of the axle member and the idler.

5. In apparatus for directing a travelling tape accurately along a particular path past a capstan, an axle member disposed in substantially parallel relationship to the axis of the capstan, a pair of arms disposed in spaced relationship, there being openings in the arms to receive the axle member, an idler supported by the axle member between the pair of arms and in rotatable relationship to the axle member, the idler being disposed relative to the capstan to provide for an engagement of opposite surfaces of the tape by the idler and the capstan, support means extending through a first one of the arms and through the opening in the arm into engagement with the axle member to support that end of the axle member, the support means being adjustable to provide for adjustments of the axle member and the idler in the radial and tangential directions relative to the capstan, a flexible disc supported by the second arm in the opening in the second arm, there being an opening in the flexible disc to receive the axle member for a pivotal movement of the axle member and the idler about the first arm as a fulcrum to obtain a regulation in the forces exerted by the idler and the capstan against the tape at different positions of the idler and the capstan, and means supported by the axle member against the flexible disc to retain the axle member within the opening in the disc.

6. The combination set forth in claim 5 in which the axle member is threaded at the end adjacent the flexible disc and in which the retaining means at the threaded end of the axle member constitutes a threaded nut disposed on the threaded end of the axle member and in which the axle member at the end adjacent the opening in the first arm is provided with a construction to adjust the axial disposition of the axle member and the idler relative to the capstan after the loosening of the nut on the threaded portion of the axle member.

7. The combination set forth in claim 5 in which the axle member is threaded at the end adjacent the flexible disc and in which the retaining means at the threaded end of the axle member constitutes a threaded nut disposed on the threaded end of the axle member and in which the axle member at the end adjacent the opening in the first arm is provided with a construction to adjust the axial disposition of the axle member and the idler relative to the capstan after the loosening of the nut on the threaded portion of the axial member and in which the support means extending through the opening in the first arm includes a first pair of set screws adjustably disposed against the axle member to vary the radial position of the axle member and the idler relative to the capstan and in which the support means extending through the opening in the first arm includes a second pair of set screws adjustably disposed relative to the axle member to vary the positioning of the axle member and the idler in the tangential direction relative to the capstan.

8. In apparatus for directing a travelling tape accurately along a particular path past an annular capstan, a spindle disposed in spaced relationship to the capstan, a pair of arms disposed in spaced relationship to each other in the axial direction of the capstan and supported at a first end by the spindle and extending from the spindle in a direction toward the capstan, there being openings in the pair of arms at the second ends of the arms opposite to the first ends, an axle member extending through the openings in the second ends of the arms opposite to the first ends and disposed in the axial direction of the capstan, an idler supported by the axle member in axial relationship to the axle member and at a position between the pair of arms and in rotatable relationship to the axle member and at a position relative to the capstan to provide for a disposition of the idler and the capstan against opposite surfaces of the tape, means extending through a first one of the arms and through the opening in the first arm and against the axle member to support the axle member in the opening of the first arm, the support means being adjustable in directions to provide for an adjustment of the axle member and the idler in the radial and tangential directions relative to the capstan for an adjustment in the forces exerted by the idler and the capstan against the opposite surfaces of the tape, a flexible disc supported by the second arm in the opening in the second arm and provided with an opening to receive the axle member for a pivotable disposition of the axle member and the idler about the first arm as a fulcrum, the flexible disc being provided with characteristics to stabilize the forces exerted by the idler and the capstan against the tape at different positions along the idler and the capstan, and means supported by the axle member against the flexible disc to retain the axle member and the idler in fixed position in the axial direction relative to the capstan.

9. The combination set forth in claim 8 in which the axle member is threaded at the end adjacent to the opening in the second arm and in which the retaining means supported by the axle member against the flexible disc constitutes a threaded nut on the threaded portion of the axle member and in which the axle member is provided with a configuration at the end adjacent to the opening in the first member to facilitate an axial adjustment of the axle member and the idler after the nut on the threaded portion of the axle member has been loosened.

10. The combination set forth in claim 8 in which the support means in the opening in the first arm includes a first pair of set screws extending through the arm at opposite ends of the axle member in the radial direction of the idler and the capstan to provide an adjustment of the axle member relative to the capstan in the radial direction in accordance with the adjustments in the disposition of the first pair of set screws and in which the support means in the opening in the first arm further includes a second pair of set screws extending through the arm at opposite ends of the axle member in the tangential direction of the idler and the capstan to provide an adjustment of the axle member relative to the capstan in the tangential direction in accordance with the adjustments in the disposition of the second pair of set screws.

11. The combination set forth in claim 8 in which the axle member is threaded at the end adjacent to the opening in the second arm and in which the retaining means supported by the axle member against the flexible disc constitutes a threaded nut on the threaded portion of the axle member and in which the axle member is provided with a configuration at the end adjacent to the opening in the first arm to facilitate an axial adjustment of the axle member and the idler after the loosening of the nut on the threaded portion of the axle member and in which the support means in the opening in the first arm includes a first pair of set screws extending through the arm at opposite ends of the axle member in the radial direction of the idler and the capstan to provide an adjustment of the axle member relative to the capstan in the radial direction in accordance with the adjustments in the disposition of the first pair of set screws and in which the support means in the opening in the first arm further includes a second pair of set screws extending through the arm at opposite ends of the axle member in the tangential direction of the idler and the capstan to provide an adjustment of the axle member relative to the capstan in the tangential direction in accordance with the adjustments in the disposition of the second pair of set screws.

12. The combination set forth in claim 11 in which the idler comprises a guide roller disposed on the spindle between the pair of arms to engage the tape and change the direction of movement of the tape and in which the arms are disposed in skewed relationship to the first and second pairs of set screws to facilitate the operation of the set screws and in which the axle member is provided with a rectangular collar to receive the first and second pairs of set screws.

References Cited in the file of this patent

UNITED STATES PATENTS

| | | |
|---|---|---|
| 282,761 | Obenchain | Aug. 7, 1883 |
| 1,515,881 | Pontius | Nov. 18, 1924 |
| 1,668,839 | Cureton | May 8, 1928 |
| 2,073,224 | Ross | Mar. 9, 1937 |
| 2,184,532 | Schroeder | Dec. 26, 1939 |